US011301595B2

(12) United States Patent
Cheong et al.

(10) Patent No.: US 11,301,595 B2
(45) Date of Patent: Apr. 12, 2022

(54) KNOWLEDGE-BASED ALTERNATIVE DESIGN RECOMMENDATIONS

(71) Applicant: AUTODESK, INC., San Rafael, CA (US)

(72) Inventors: Hyunmin Cheong, Toronto (CA); Wei Li, Toronto (CA); Francesco Iorio, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1170 days.

(21) Appl. No.: 15/719,445

(22) Filed: Sep. 28, 2017

(65) Prior Publication Data

US 2018/0089575 A1 Mar. 29, 2018

Related U.S. Application Data

(60) Provisional application No. 62/401,482, filed on Sep. 29, 2016, provisional application No. 62/401,466, filed on Sep. 29, 2016.

(51) Int. Cl.
  *G06N 5/04* (2006.01)
  *G06F 30/00* (2020.01)
  (Continued)

(52) U.S. Cl.
  CPC .............. *G06F 30/00* (2020.01); *G06F 30/15* (2020.01); *G06N 5/04* (2013.01); *G06F 2111/20* (2020.01); *G06N 5/022* (2013.01)

(58) Field of Classification Search
  CPC . G06N 5/04; G06N 5/022; G06N 5/40; G06F 30/00; G06F 30/15; G06F 2111/20
  See application file for complete search history.

(56) References Cited

U.S. PATENT DOCUMENTS 5,726,903 A * 3/1998 Kerzman ................ G06F 30/30
  716/103
7,188,333 B1 * 3/2007 LaMotta ................ G06Q 10/02
  705/28

(Continued)

FOREIGN PATENT DOCUMENTS

| JP | 2004054363 A | * | 2/2004 |
| JP | 2010055439 A | * | 3/2010 |
| JP | 4969536 B2 | * | 7/2012 |

OTHER PUBLICATIONS

El-Mehalawi et al, "A database system of mechanical components based on geometric and topological similarity. Part I: representation", Jan. 2003, ScienceDirect, pp. 83-94. (Year: 2003).*

(Continued)

*Primary Examiner* — Paulinho E Smith
(74) *Attorney, Agent, or Firm* — Artegis Law Group, LLP

(57) ABSTRACT

Embodiments of the invention disclosed herein provide techniques for generating an alternative design recommendation. The techniques include determining, via a processor, a first function associated with one or more first components included in a first design. The techniques further include analyzing, via the processor, a plurality of components included in a database to select one or more second components associated with a second function that corresponds to the first function. The techniques further include causing an alternative design recommendation that includes the one or more second components to be output for display.

20 Claims, 8 Drawing Sheets

(51) Int. Cl.
*G06F 30/15* (2020.01)
*G06N 5/02* (2006.01)
*G06F 111/20* (2020.01)

(56) References Cited

U.S. PATENT DOCUMENTS

| | | | |
|---|---|---|---|
| 7,676,292 B2 | 3/2010 | Weatherhead et al. | |
| 9,483,584 B2* | 11/2016 | Batra | G06F 30/00 |
| 10,013,510 B1* | 7/2018 | Kanthasamy | G06F 30/20 |
| 2003/0078676 A1* | 4/2003 | Kuribayashi | G06F 16/54 |
| | | | 700/1 |
| 2003/0225555 A1* | 12/2003 | Gurumoorthy | G06F 30/00 |
| | | | 703/9 |
| 2004/0153188 A1* | 8/2004 | Yuda | G06F 30/00 |
| | | | 700/106 |
| 2005/0278271 A1* | 12/2005 | Anthony | G06F 30/00 |
| | | | 700/107 |
| 2010/0042380 A1* | 2/2010 | Suh | G06F 30/00 |
| | | | 703/1 |
| 2010/0156936 A1* | 6/2010 | Maeda | G06F 16/5854 |
| | | | 345/647 |
| 2011/0167372 A1* | 7/2011 | Iwai | G06F 30/00 |
| | | | 715/771 |
| 2011/0208484 A1* | 8/2011 | Ezaki | G06F 30/30 |
| | | | 703/1 |
| 2012/0095884 A1* | 4/2012 | Tanabe | G06Q 10/087 |
| | | | 705/28 |
| 2012/0276309 A1* | 11/2012 | Failing | A63C 5/03 |
| | | | 428/34.1 |
| 2013/0218725 A1* | 8/2013 | Kettner | G06Q 30/0631 |
| | | | 705/26.63 |
| 2014/0129182 A1* | 5/2014 | Weatherhead | G06F 30/00 |
| | | | 703/1 |
| 2017/0124248 A1* | 5/2017 | Whalley | E21B 17/00 |
| 2018/0089575 A1* | 3/2018 | Cheong | G06F 30/00 |
| 2018/0247356 A1* | 8/2018 | Thompson | G06N 5/022 |
| 2018/0314229 A1* | 11/2018 | Biazetti | G05B 19/408 |

OTHER PUBLICATIONS

Non-Final Office Action received for U.S. Appl. No. 15/719,449, dated Jan. 22, 2020, 9 pages.
Final Office Action received for U.S. Appl. No. 15/719,449, dated May 14, 2020, 10 pages.

* cited by examiner

KNOWLEDGE-BASED ALTERNATIVE DESIGN RECOMMENDATIONS

CROSS-REFERENCE TO RELATED APPLICATIONS

This application claims the priority benefit of the U.S. Provisional Patent Application having Ser. No. 62/401,466 filed on Sep. 29, 2016, and the U.S. Provisional Patent Application having Ser. No. 62/401,482 filed on Sep. 29, 2016. The subject matter of these related application are hereby incorporated herein by reference.

BACKGROUND OF THE INVENTION

Field of the Invention

The present invention relates generally to computer-aided design systems and, more specifically, to knowledge-based alternative design recommendations.

Description of the Related Art

A wide variety of software applications for generating designs are currently available to end-users, including computer-aided design (CAD) applications, graphical programming applications, modeling and animation applications, among others. Many of these software applications allow a user to generate a design by creating design components and then defining relationships between the components. For example, in the context of a CAD application, a user could create mechanical components that are to be included in a design and could then define mechanical connections between those components.

With respect to CAD applications, requiring users to manually draft a two-dimensional or three-dimensional representation of each component in a new design can impose significant burdens on users in terms of both time and effort. Accordingly, in order to enable users to more quickly generate various types of designs, many CAD applications provide users with a database of preexisting components. Users are then able to select one or more components from the database in order to generate a new design.

Although providing users of CAD applications with databases of preexisting components saves significant time and effort, CAD applications still require users to start from scratch when generating a new design. For example, in the context of a mechanical design (e.g., a vehicle), a user would still need to select hundreds or thousands of different components and then define mechanical connections between each of those components each time a new design is generated. Consequently, generating designs using conventional CAD applications can still be quite time-consuming and tedious.

Additionally, although conventional CAD applications oftentimes provide users with a wide variety of preexisting components that can be added to a design, a user may not be familiar with all of those components. Combining hundreds or thousands of different components may result in a seemingly endless number of possible designs. Typically, users would rely on their experience and expertise to reduce these combinations to a much smaller subset of suitable designs. However, for novice designers, selecting suitable combinations of components could be difficult. As a result, the user may not select optimal preexisting components when generating a particular type of design.

As the foregoing illustrates, what is needed in the art are more effective techniques for generating new designs in CAD applications.

SUMMARY OF THE INVENTION

Embodiments of the present application set forth a method for generating an alternative design recommendation. The method includes determining, via a processor, a first function associated with one or more first components included in a first design. The method further includes analyzing, via the processor, a plurality of components included in a database to select one or more second components associated with a second function that corresponds to the first function. The method further includes causing an alternative design recommendation that includes the one or more second components to be output for display Other embodiments of the present invention include, without limitation, a computer-readable medium including instructions for performing one or more aspects of the disclosed techniques, as well as a computing device for performing one or more aspects of the disclosed techniques.

One advantage of the disclosed techniques is that a user is able to generate portions of a design without having to manually select each and every component in the design and/or without having to manually specify relationships between one or more components in the design. Additionally, a user who is not familiar with all of the preexisting components stored in a data store can be presented with recommendations that include one or more components that are most relevant to the particular design being generated by the user. Accordingly, users can more quickly and efficiently generate designs that include optimal components and/or component relationships relative to prior art techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Hardware Overview

Figure 1:
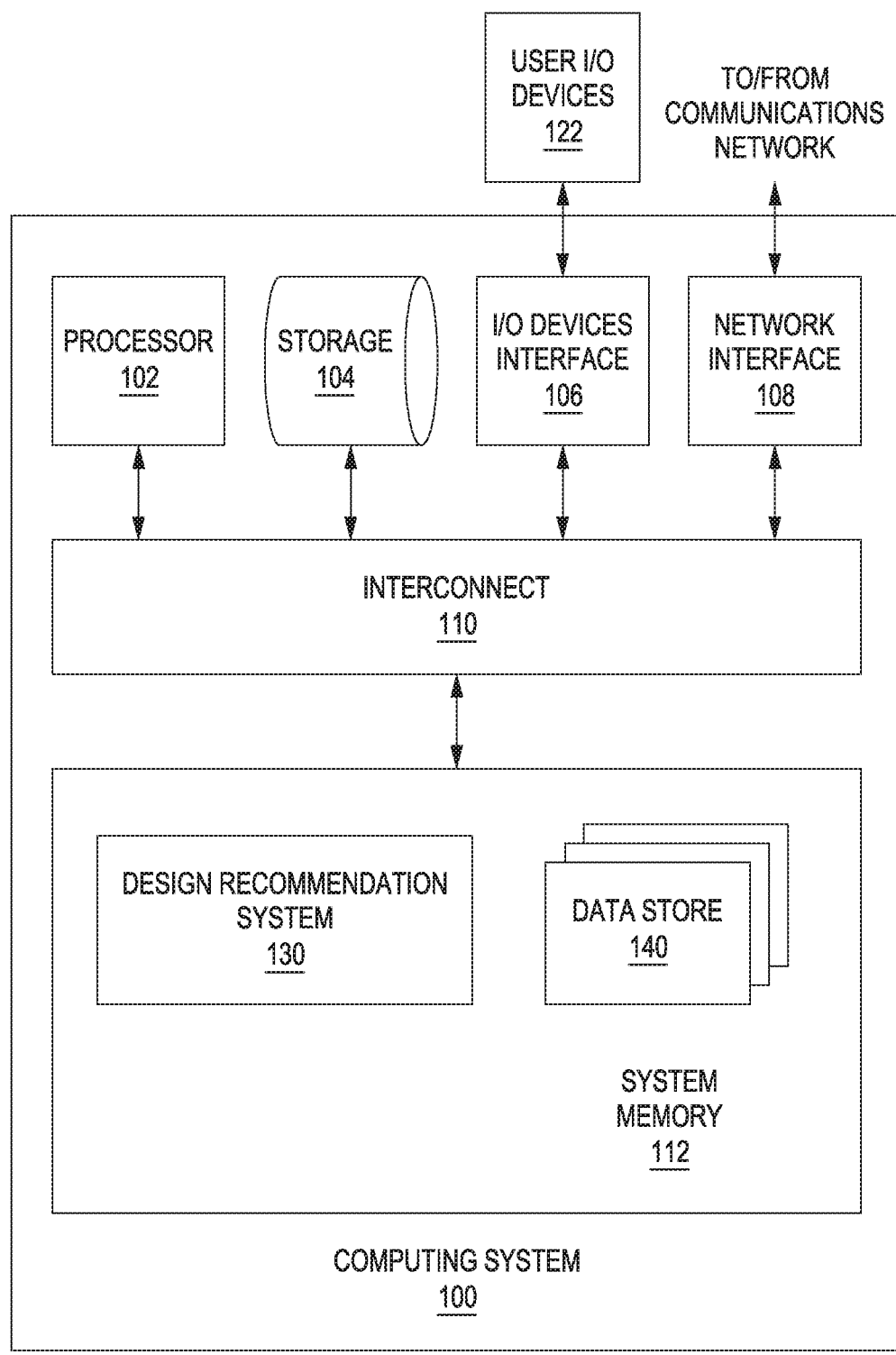
FIG. 1 is a block diagram of a computing system configured to implement one or more aspects of the present invention.

FIG. 1 is a block diagram of a computing system 100 configured to implement one or more aspects of the present invention. As shown, the computing system 100 includes, without limitation, a processor 102, storage 104, input/output (I/O) devices interface 106, a network interface 108, an interconnect 110, and a system memory 112.

In general, processor 102 retrieves and executes programming instructions stored in system memory 112. Processor 102 may be any technically feasible form of processing device configured to process data and execute program code. Processor 102 could be, for example, a central processing unit (CPU), a graphics processing unit (GPU), an application-specific integrated circuit (ASIC), a field-programmable gate array (FPGA), and so forth. Processor 102 stores and retrieves application data residing in the system memory 112. Processor 102 is included to be representative of a single CPU, multiple CPUs, a single CPU having multiple processing cores, and the like. In operation, processor 102 is the master processor of computing system 100, controlling and coordinating operations of other system components. System memory 112 stores software applications and data for use by processor 102. Processor 102 executes software applications stored within system memory 112 and optionally an operating system. In particular, processor 102 executes software and then performs one or more of the functions and operations set forth in the present application.

The storage 104 may be a disk drive storage device. Although shown as a single unit, the storage 104 may be a combination of fixed and/or removable storage devices, disk drives, solid state drives (SSDs), tape drives, removable memory cards, optical storage, network attached storage (NAS), or a storage area-network (SAN). Processor 102 communicates to other computing devices and systems via network interface 108, where network interface 108 is configured to transmit and receive data via a communications network. Such a communications network broadly represents one or more LANs, WANs, cellular networks (e.g., LTE, HSPA, 3G, and other cellular technologies), and/or networks using any of wired, wireless, terrestrial microwave, or satellite links, and may include the public Internet.

The interconnect 110 facilitates transmission, such as of programming instructions and application data, between the processor 102, input/output (I/O) devices interface 106, storage 104, network interface 108, and system memory 112. The I/O devices interface 106 is configured to receive input data from user I/O devices 122. Examples of user I/O devices 122 may include one or more buttons, a keyboard, a touchscreen, and a mouse or any other type of pointing device. The I/O devices interface 106 may also include an audio output unit configured to generate an electrical audio output signal, and user I/O devices 122 may further include a speaker configured to generate an acoustic output in response to the electrical audio output signal. Another example of a user I/O device 122 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The system memory 112 includes, without limitation, a design recommendation application 130 and a data store 140. In operation, processor 102 executes design recommendation application 130 to perform one or more of the techniques disclosed herein.

It will be appreciated that the system shown herein is illustrative and that variations and modifications are possible. The connection topology, including the number and arrangement of bridges, may be modified as desired.

Knowledge-Based Design Recommendation System

As discussed above, design applications that provide users with a database of preexisting components enable the user to save significant time and effort by selecting, instead of manually creating, one or more design components. However, such systems typically require users to start from scratch when generating designs. Consequently, generating designs using such systems can still be quite time-consuming.

In addition, although such systems often provide a wide variety of preexisting components that can be added to a design, a user may not be familiar with all of the preexisting components included in the database. As a result, the user may not select the optimal components from the database when generating a particular design.

Accordingly, in various embodiments, while a user is generating a particular design, design recommendation application 130 may be implemented to provide the user with design autocomplete recommendations and/or alternative design recommendations. In some embodiments, design recommendation application 130 compares components included in a design being generated by the user to components included in data store 140 to determine that one or more components will be suggested to the user. For example, the design recommendation application 130 could determine that one or more components that are selected by a user when generating a particular design are the same as or similar to one or more components included in a preexisting design stored in data store 130. An autocomplete recommendation that includes one or more additional components that are included in the preexisting design, but are not included in the user's design, could then be displayed to the user. The user could then accept the autocomplete recommendation to cause the additional component(s) and/or component relationships to be automatically added to the user's design. As a result, the user is able to quickly generate remaining portions of the design, without requiring the user to manually select each of the additional components and/or without requiring the user to manually specify relationships between one or more components.

In another example, the design recommendation application 130 could determine that a particular component included in a design generated by the user is the same as or similar to a component stored in data store 130. For example, the design recommendation application 130 could determine that a component included in a design generated by the user performs the same or a similar function as a different component stored in data store 130. That different component could then be suggested to the user as an alternative to the component that was selected by the user.

Figure 2:
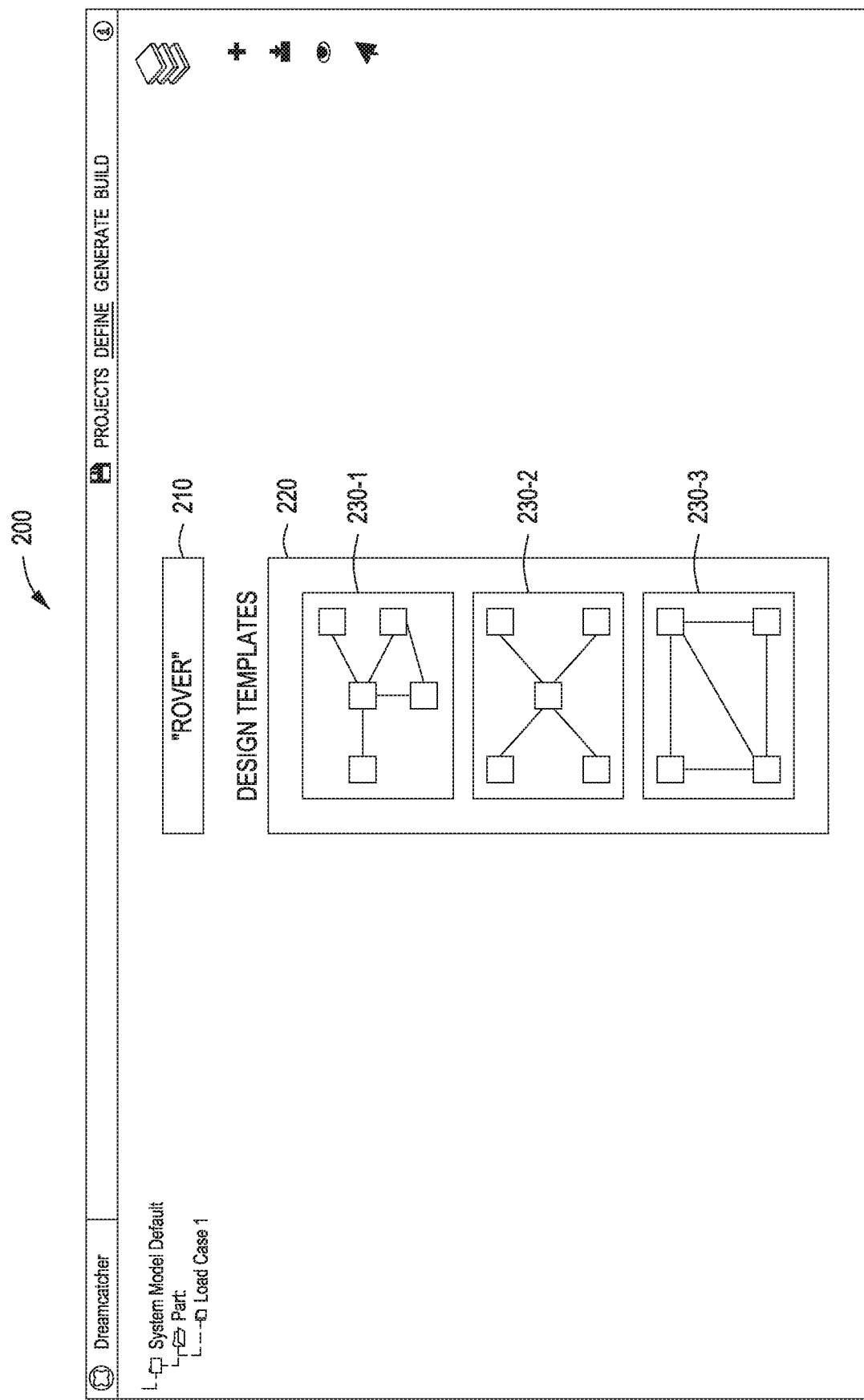
FIG. 2 illustrates a graphical user interface (GUI) for querying the data store of FIG. 1 in order to retrieve one or more design templates, according to various embodiments of the present invention.

FIG. 2 illustrates a graphical user interface (GUI) 200 for querying the data store 140 of FIG. 1 in order to retrieve one or more design templates 230, according to various embodiments of the present invention. As shown, the GUI 200 may include a query box 210 and a query results window 220. The query results window 220 includes zero or more design templates 230 that match a particular search query entered by user.

In various embodiments, a user may generate a design from scratch, for example, by manually selecting one or more components from data store 140 and then specifying relationships between the components. In some embodiments, however, the user may begin with a design template 230 that may include various components of a particular design. For example, as shown in FIG. 2, a user could query the data store 140 for a "rover" design template 230. In response to the user query, the design recommendation application 130 could display one or more rover design templates 230 that include core components of a rover design, such as a chassis, wheels, etc.

Upon receiving a user selection a particular design template 230, the design recommendation application 130 causes the GUI 200 to be populated with the components specific in the design template 230. The user is then able to interact with the GUI 200 to add components, remove components, and/or receive alternative component recommendations and component autocomplete recommendations, as further described below.

Knowledge-Based Autocomplete Recommendations

Figure 3A:
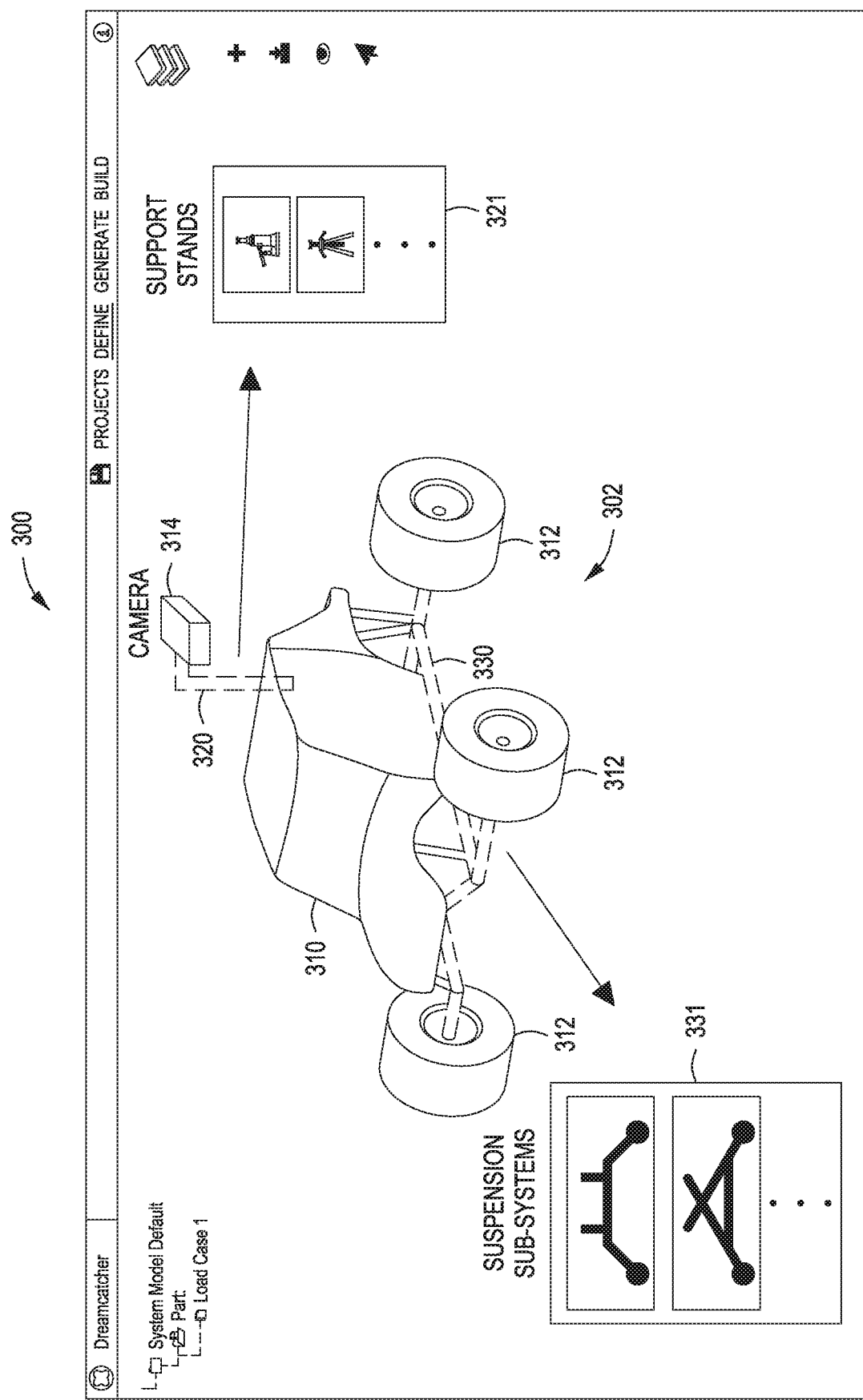
FIG. 3A illustrates a GUI for outputting autocomplete recommendations to a user, according to various embodiments of the present invention.

FIG. 3A illustrates a GUI 300 for outputting autocomplete recommendations to a user, according to various embodiments of the present invention. As shown, GUI 300 includes various components, including a vehicle body 310, wheels 312, and a camera 314, that have been selected by a user to generate portions of a vehicle design 302. Based on the user component selections, the design recommendation application 130 then displays one or more autocomplete recommendations in the GUI 300.

For example, in response to the user selecting the vehicle body 310 and the camera 314, the design recommendation application 130 could display a support stand autocomplete recommendation 320 in the GUI 300. In some embodiments, the design recommendation application 130 could overlay a translucent representation of the support stand autocomplete recommendation 320 at the relevant position on the vehicle design 302. Additionally or alternatively, the design recommendation application 130 could display an autocomplete recommendation window 321 that includes representations of one or more support stands 320 that could be added to the vehicle design 302. The user could then accept the support stand autocomplete recommendation 320, such as by clicking on the support stand autocomplete recommendation 320, in order to cause the design recommendation application 130 to add the support stand to the design.

In another example, in response to the user selecting the vehicle body 310 and the wheels 312, the design recommendation application 130 could display a suspension subsystem autocomplete recommendation 330 in the GUI 300. As shown, the suspension subsystem autocomplete recommendation 330 could be overlaid at the relevant position on the vehicle design 302 and/or an autocomplete recommendation window 331 including representations of one or more suspension subsystems 330 could be displayed in the GUI 300. The user could then click on the suspension subsystem autocomplete recommendation 330 or on a recommendation included in the autocomplete recommendation window 331 in order to cause the design recommendation application 130 to add a particular suspension subsystem to the design.

Various techniques may be implemented by the design recommendation application 130 to generate autocomplete recommendations. In some embodiments, the design recommendation application 130 may compare a particular design being generated by the user to one or more preexisting designs that are stored in data store 140 to determine a measure of similarity between the designs. For example, the design recommendation application 130 could determine that the design being generated by the user and a preexisting design included in data store 140 include one or more of the same components and/or component relationships. In response, the design recommendation application 130 could generate an autocomplete recommendation that includes one or more components or component relationships that are included in the preexisting design, but which are not included in the design being generated by the user.

In some embodiments, autocomplete recommendations are generated based on one or more graph matching algorithms. In such embodiments, each design may be represented as a graph in which nodes represent components included in the design. Each graph may further include one or more edges between the nodes, where each represents a relationship (e.g., a physical connection, an electrical connection, a logical connection, etc.) between two or more components included in the design. The design recommendation application 130 could then compare a graph that corresponds to a design being generated by a user to one or more graphs associated with preexisting designs to determine a percentage of common nodes and/or common edges between the graphs. The design recommendation application 130 could then generate an autocomplete recommendation that includes one or more nodes and/or edges that are included in a graph associated with a preexisting design, but which are not included in the graph associated with the design being generated by the user.

Further, in some embodiments, the design recommendation application 130 could generate autocomplete recommendations based on the probability that a particular component is likely to be included in a design being generated by a user. For example, the design recommendation application 130 could analyze graphs associated with preexisting designs to determine that, when a certain set of components is included in a preexisting design, one or more additional components are commonly included in the design as well. Then, in response to determining that a design being generated by a user includes the set of components, the design recommendation application 130 could generate an autocomplete recommendation that includes the one or more additional components.

Figure 3B:
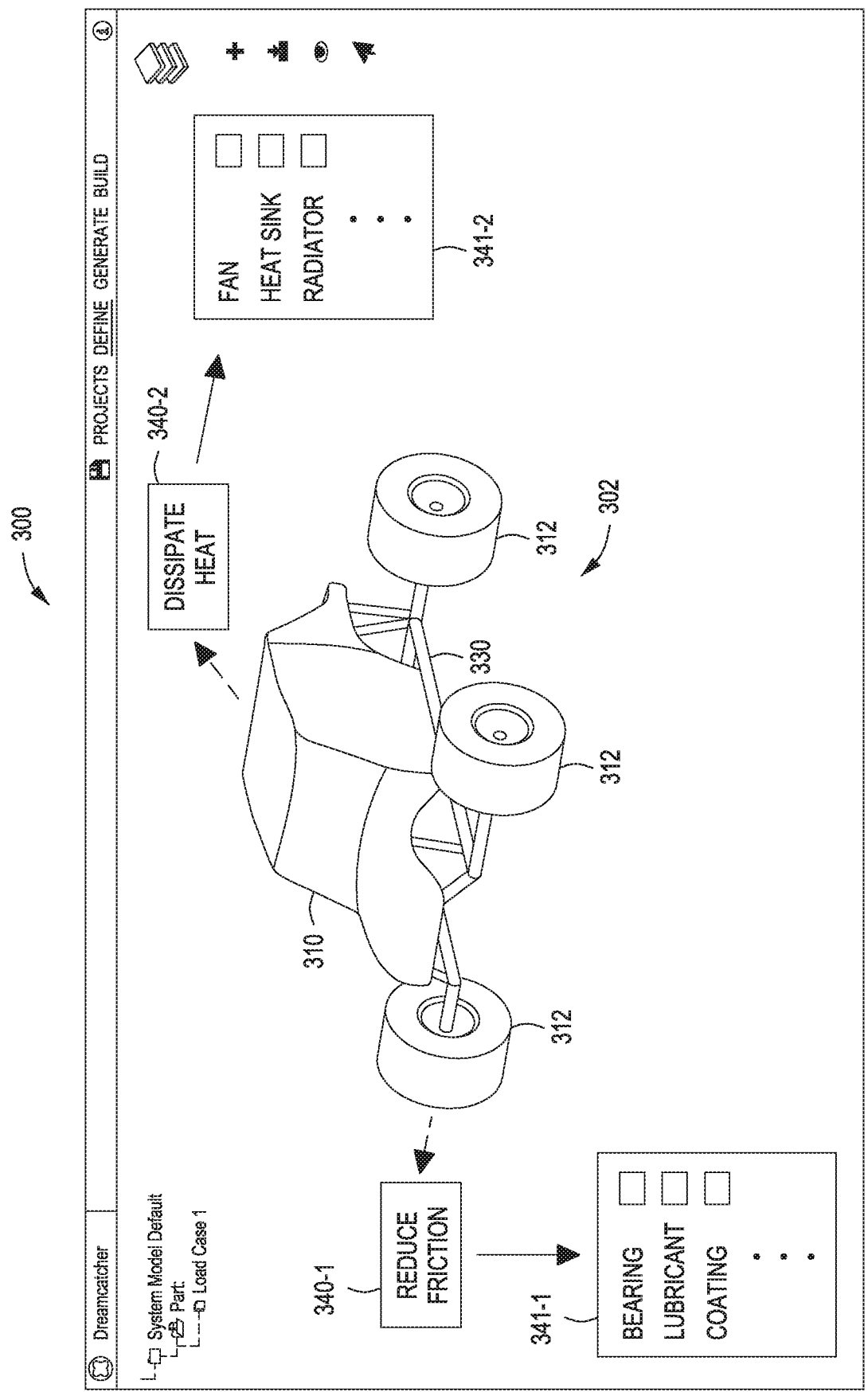
FIG. 3B illustrates a technique for outputting an autocomplete recommendation in the GUI of FIG. 3A based on a function specified by a user, according to various embodiments of the present invention.

FIG. 3B illustrates a technique for outputting an autocomplete recommendation in the GUI 300 of FIG. 3A based on a function specified by a user, according to various embodiments of the present invention. In various embodiments, a user may specify a desired function for a particular component. For example, in some embodiments, the design recommendation application 130 could display to the user a list of functions that could be assigned to a particular component and/or the user could submit a search query to the design recommendation application 130 to search through a list of available functions that could be assigned to a component. Then, once the user specifies a desired function for the component, the design recommendation application 130 may generate one or more autocomplete recommendations which include component(s) that perform the desired function or a similar function.

For example, as shown, a user could specify a reduce friction function 340-1 via GUI 300. The user could further specify one or more components with which the reduce friction function 340-1 should be implemented. In response, the design recommendation application 130 could generate autocomplete recommendations 341-1, which include components that reduce friction between a suspension subsystem 330 and a wheel 312. In some embodiments, the design recommendation application 130 may generate such autocomplete recommendations by analyzing the data store 140 of preexisting designs to determine (e.g., via a graph matching algorithm) that a particular component (e.g., a bearing, a lubricant, a coating, etc.) is commonly implemented to perform the desired function with the components specified by the user.

In another example shown in FIG. 3B, a user could specify a dissipate heat function 340-2 via GUI 300. The user could further specify one or more components with which the dissipate heat function 340-2 should be implemented. In response, the design recommendation application 130 could generate autocomplete recommendations 341-2 which include components that dissipate heat with respect to a vehicle body 310. For example, the design recommendation application 130 could analyze the data store 140 of preexisting designs to determine that a particular component (e.g., a fan, a heat sink, a radiator, etc.) is commonly implemented to dissipate heat with the type of vehicle body 310 selected by the user.

Additionally or alternatively, the design recommendation application 130 could infer a function 350 that corresponds to one or more components included in a design. The design recommendation application 130 could then generate an autocomplete recommendation 351 which includes component(s) that perform the inferred function 350. For example, a user could select one or more components to be included in a design, such as a vehicle body 310 and a vehicle suspension arm 316. The design recommendation application 130 could then analyze preexisting designs stored in data store 140 to determine that, in the preexisting designs, a particular function is commonly specified as being performed by the one or more components. Such a determination may be made by comparing preexisting designs to each other and/or to a design being generated by a user (e.g., based on one or more graph matching algorithms). The design recommendation application 130 could then display the recommended function and/or one or more autocomplete recommendations 351 which include components that perform the recommended function.

Knowledge-Based Alternative Design Recommendations

Figure 4A:
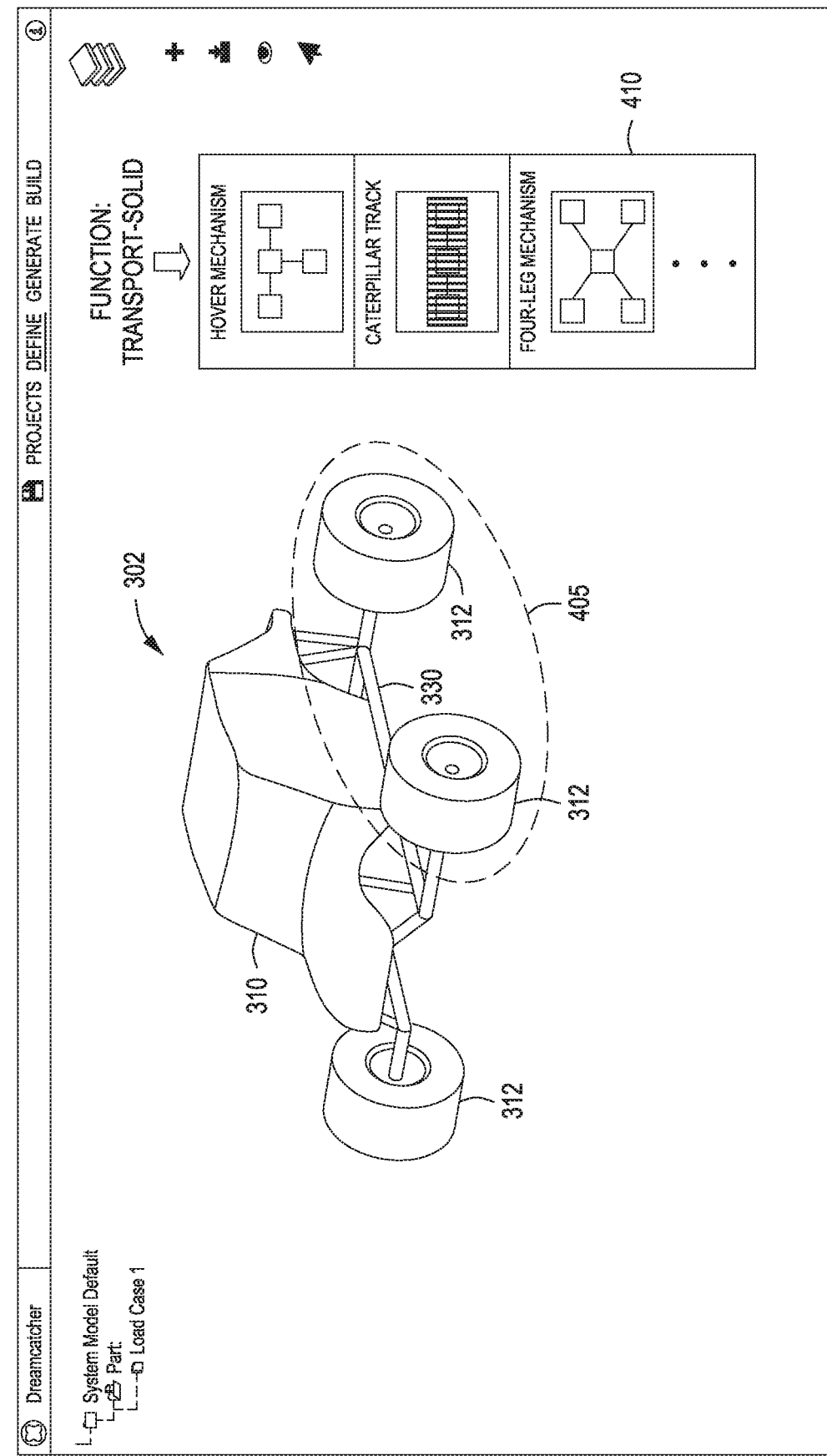
FIG. 4A illustrates a technique for outputting an alternative design recommendation in the GUI of FIG. 3A, according to various embodiments of the present invention.

FIG. 4A illustrates a technique for outputting an alternative design recommendation in the GUI 300 of FIG. 3A, according to various embodiments of the present invention.

As shown, a user may select various components to generate vehicle design 302 in GUI 300. For example, a user could manually select individual components and/or select a design template 230 that includes one or more components. Based on the user component selections, the design recommendation application 130 could then display one or more alternative design recommendations 410 in the GUI 300. The user could then accept the alternative design recommendation(s) 410 (e.g., by clicking on an alternative design recommendation 410) in order to cause the design recommendation application 130 to exchange component(s) included in the design with the alternative component(s) indicated in the alternative design recommendation(s) 410.

In various embodiments, the design recommendation application 130 generates alternative design recommendations for a single component type included in a particular design. For example, with reference to the vehicle design 302 shown in FIG. 4A, the design recommendation application 130 could generate alternative design recommendation(s) for the wheels 312 by displaying other types of components that perform one or more function(s) that are the same as or similar to the function(s) performed by the wheels 312. In another example, after the user has selected a particular suspension subsystem 330, the design recommendation application 130 could generate alternative design recommendation(s) for the suspension subsystem 330 by displaying other types of components that perform function(s) that are the same as or similar to the function(s) performed by the suspension subsystem 330.

In some embodiments, the functions performed by a particular component or component assembly, may be specified in terms of degrees of freedom (e.g., pitch, yaw, roll, etc.). The design recommendation application 130 could then generate alternative design recommendation(s) by displaying components having the same or similar degrees of freedom.

As noted above, the design recommendation application 130 could generate alternative design recommendations for a particular component by displaying other components that perform one or more function(s) that are the same as or similar to the function(s) performed by that particular component. Additionally or alternatively, the design recommendation application 130 could generate alternative design recommendations for a particular component by displaying other components that have a similar number of connections (e.g., edges) to other components and/or similar types of connections to other components. For example, the design recommendation application 130 could determine that a suspension subsystem 330 included in a design couples to the vehicle body 310 at two different locations. In response, the design recommendation application 130 could generate one or more alternative design recommendations 410 that include a suspension subsystem 330 which couples to the vehicle body 310 at two different locations. In another example, the design recommendation application 130 could determine that a suspension subsystem 330 included in a design couples to the vehicle body 310 via a rotatable connection having one degree of freedom (e.g., yaw). In response, the design recommendation application 130 could generate one or more alternative design recommendations 410 that include a suspension subsystem 330 which couples to the vehicle body 310 via a rotatable connection having one degree of freedom.

Additionally, in some embodiments, the design recommendation application 130 could generate one or more alternative design recommendations for component assemblies 405 that include multiple components. For example, as shown in FIG. 4A, the design recommendation application 130 could generate alternative design recommendation(s) (e.g., a hover mechanism, a caterpillar track, or a four-leg mechanism) for a component assembly 405 that includes both the suspension subsystem 330 and the wheels 312. In general, the design recommendation application 130 could generate alternative design recommendations for component assemblies 405 that include any number of components.

In various embodiments, alternative design recommendations generated by the design recommendation application 130 may be based on the function and/or connections associated with a particular component and/or the probability that a particular component is likely to be implemented in a particular design. For example, as described above, the design recommendation application 130 could analyze graphs associated with preexisting designs to determine that, when a certain set of components is included in a preexisting design, one or more additional components are commonly included in the design as well. Then, based on determining that a design being generated by a user includes the set of components, the design recommendation application 130 could generate an alternative design recommendation that includes the one or more additional components.

Figure 4B:
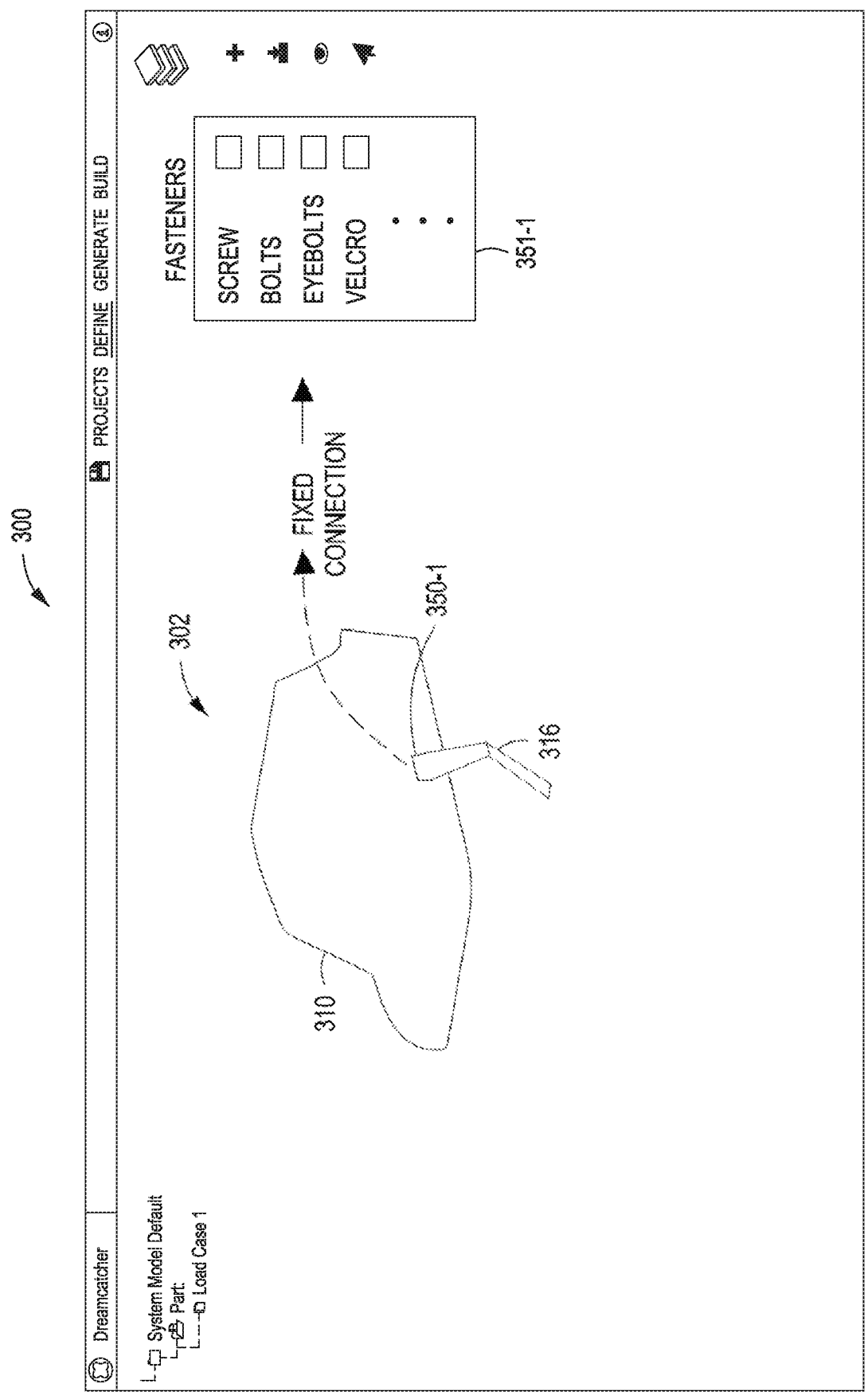
FIG. 4B illustrates a technique for outputting an alternative design recommendation in the GUI of FIG. 3A based on a function specified for one or more components included in a design, according to various embodiments of the present invention.

FIG. 4B illustrates a technique for outputting an alternative design recommendation in the GUI 300 of FIG. 3A based on a function specified for one or more components included in a design, according to various embodiments of the present invention. As shown, a user may select one or more components to be included in a design, such as a vehicle body 310 and a vehicle suspension arm 316. The user may further specify that a fixed connection 350-1 is to be implemented between the vehicle body 310 and the vehicle suspension arm 316. The design recommendation application 130 could then display one or more autocomplete recommendations 351 that include components (e.g., a screw, a bolt, an eyebolt, or Velcro®) that could alternatively be implemented to perform the function of the fixed connection 350-1.

Figure 5:
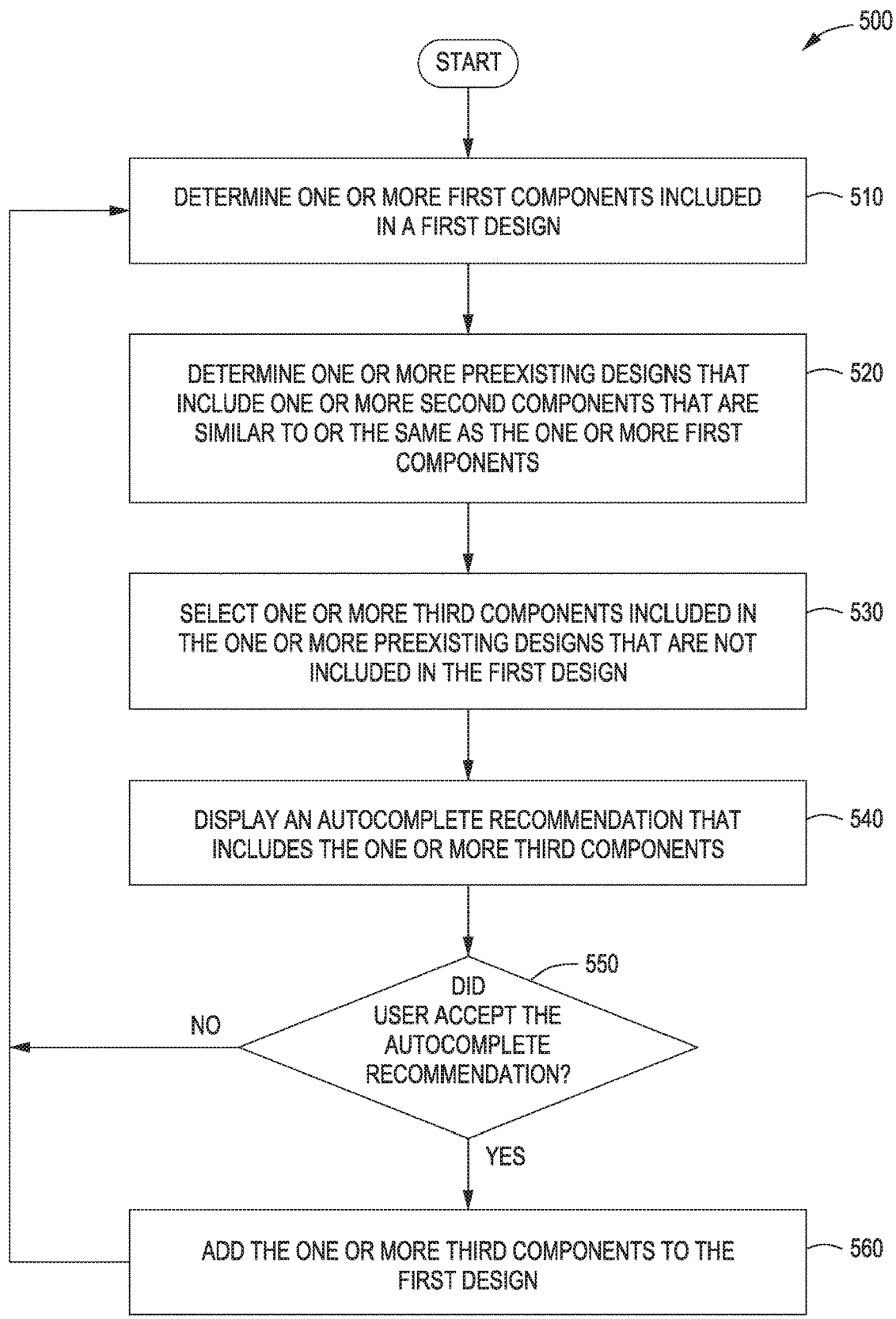
FIG. 5 is a flow diagram of method steps for generating and outputting autocomplete design recommendations to a user, according to various embodiments of the present invention.

FIG. 5 is a flow diagram of method steps for generating and outputting autocomplete design recommendations to a user, according to various embodiments of the present invention. Although the method steps are described in conjunction with the systems of FIGS. 1-4B, persons of ordinary skill in the art will understand that any system configured to perform the method steps, in any order, is within the scope of the present invention.

As shown, a method 500 begins at step 510, where the design recommendation application 130 determines one or more components included in a first design. At step 520, the recommendation application 130 determines one or more preexisting designs that include one or more components that are the same as or similar to the one or more components included in the first design. For example, as described above, at step 520, the recommendation application 130 could implement one or more graph matching algorithms to determine a measure of similarity (e.g., a number or percentage of shared nodes and/or edges) between the first design and a second design received from data store 140. The recommendation application 130 could then select a design having a threshold measure of similarity.

Next, at step 530, the recommendation application 130 selects one or more components that are included in the second design, but which are not included in the first design. At step 540, the recommendation application 130 outputs an autocomplete recommendation (e.g., by displaying a recommendation in a GUI) which includes the one or more components that are included in the second design, but which are not included in the first design. Then, at step 550, the recommendation application 130 determines whether the user accepted the autocomplete recommendation, such as by clicking on the autocomplete recommendation.

If, at step 550, the recommendation application 130 determines that the user accepted the autocomplete recommendation, then the method 500 proceeds to step 560, where the recommendation application 130 adds, to the first design, the one or more components that are included in the second design, but which are not yet included in the first design. If, at step 550, the recommendation application 130 determines that the user did not accept the autocomplete recommendation, then the method 500 returns to step 510.

Figure 6:
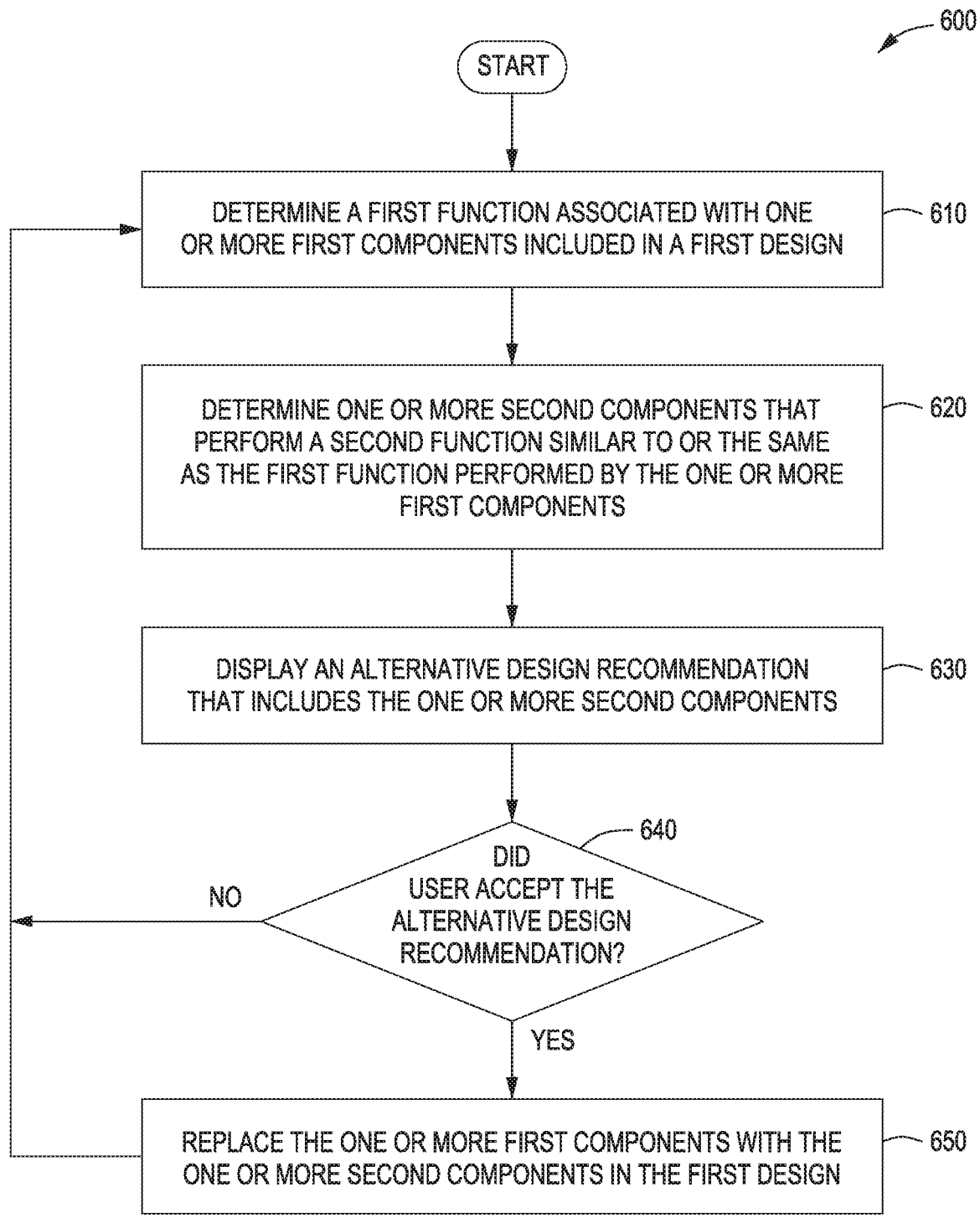
FIG. 6 is a flow diagram of method steps for generating and outputting alternative design recommendations to a user, according to various embodiments of the present invention.

FIG. 6 is a flow diagram of method steps for generating and outputting alternative design recommendations to a user, according to various embodiments of the present invention. Although the method steps are described in conjunction with the systems of FIGS. 1-4B, persons of ordinary skill in the art will understand that any system configured to perform the method steps, in any order, is within the scope of the present invention.

As shown, a method 600 begins at step 610, where the design recommendation application 130 determines a first function associated with one or more components included in a first design. At step 620, the design recommendation application 130 determines one or more components which perform a second function that is the same as or similar to the first function. In some embodiments, the first function and the second function may be identical functions. Then, at step 630, the design recommendation application 130 outputs an alternative design recommendation that includes the one or more components that perform the second function.

Next, at step 640, the recommendation application 130 determines whether the user accepted the alternative design recommendation, such as by clicking on the alternative design recommendation. If, at step 640, the recommendation application 130 determines that the user accepted the alternative design recommendation, then the method 600 proceeds to step 650, where the recommendation application 130 replaces the one or more components that perform the first function with the one or more components that perform the second function. If, at step 640, the recommendation application 130 determines that the user did not accept the alternative design recommendation, then the method 600 returns to step 610.

In sum, a design recommendation application determines that one or more components selected by a user when generating a particular design are the same as or similar to one or more components included in a preexisting design stored in a data store. The design recommendation application then outputs an autocomplete recommendation that includes one or more additional components that are included in the preexisting design, but are not included in the user's design. If the user accepts the autocomplete recommendation, then the design recommendation application causes the additional component(s) to be automatically added to the design.

Additionally, in various embodiments, the design recommendation application determines that a particular component included in a design generated by a user is the same as or similar to a component stored in data store. For example, the design recommendation application could determine that a component included in a design generated by the user performs the same or a similar function as a different component stored in data store. The design recommendation application then suggests that different component to the user as an alternative to the component that was initially selected by the user.

At least one advantage of the disclosed techniques is that a user is able to generate portions of a design without having to manually select each and every component in the design and/or without having to manually specify relationships between one or more components in the design. Additionally, a user who is not familiar with all of the preexisting components stored in a data store can be presented with recommendations that include one or more components that are most relevant to the particular design being generated by the user. Accordingly, users can more quickly and efficiently generate designs that include optimal components and/or component relationships relative to prior art techniques.

Any and all combinations of any of the claim elements recited in any of the claims and/or any elements described in this application, in any fashion, fall within the contemplated scope of the present invention and protection.

1. In some embodiments, a method for generating an alternative design recommendation, the method comprises: determining, via a processor, a first function associated with one or more first components included in a first design; analyzing, via the processor, a plurality of components included in a database to select one or more second components associated with a second function that corresponds to the first function; and causing an alternative design recommendation that includes the one or more second components to be output for display.

2. The computer-implemented method of clause 1, further comprising automatically replacing the one or more first components with the one or more second components in the first design.

3. The method of either of clauses 1 or 2, wherein determining the first function comprises receiving a user selection that assigns the first function to the one or more first components.

4. The method of any of clauses 1-3, further comprising retrieving, from the database, the first function in response to receiving a user selection of the one or more first components.

5. The method of any of clauses 1-4, further comprising computing a measure of similarity between the first function and the second function.

6. The method of any of clauses 1-5, wherein selecting the one or more second components is performed in response to determining that the first function is the same or substantially the same as the second function.

7. The method of any of clauses 1-6, further comprising computing a measure of similarity between the first design and a second design stored in the database, wherein the second design includes the one or more second components.

8. The method of any of clauses 1-7, further comprising selecting the second design based on the measure of similarity.

9. The method of any of clauses 1-8, further comprising: computing a measure of similarity between a first graph that corresponds to the first design and a second graph that corresponds to a second design, wherein the second design includes the one or more second components; and selecting the second design in response to determining that the measure of similarity between is above a threshold level.

10. The method of any of clauses 1-9, wherein the measure of similarity between the first design and the second design is computed based on one or more graph matching algorithms.

11. In some embodiments, a non-transitory computer-readable storage medium includes instructions that, when executed by a processor, cause the processor to perform the steps of: determining, via a processor, a first function associated with one or more first components included in a first design; analyzing, via the processor, a plurality of components included in a database to select one or more second components associated with a second function that corresponds to the first function; and causing an alternative design recommendation that includes the one or more second components to be output for display.

12. The non-transitory computer-readable storage medium of clause 11, further comprising automatically replacing the one or more first components with the one or more second components in the first design.

13. The non-transitory computer-readable storage medium of either of clauses 11 or 12, wherein determining the first function comprises receiving a user selection that assigns the first function to the one or more first components.

14. The non-transitory computer-readable storage medium of any of clauses 11-13, further comprising retrieving, from the database, the first function in response to receiving a user selection of the one or more first components.

15. The non-transitory computer-readable storage medium of any of clauses 11-14, further comprising computing a measure of similarity between the first function and the second function.

16. The non-transitory computer-readable storage medium of any of clauses 11-15, wherein selecting the one or more second components is performed in response to determining that the first function is the same or substantially the same as the second function.

17. The non-transitory computer-readable storage medium of any of clauses 11-16, further comprising computing a measure of similarity between the first design and a second design stored in the database, wherein the second design includes the one or more second components.

18. The non-transitory computer-readable storage medium of any of clauses 11-17, further comprising selecting the second design based on the measure of similarity.

19. The non-transitory computer-readable storage medium of any of clauses 11-18, further comprising: computing a measure of similarity between a first graph that corresponds to the first design and a second graph that corresponds to a second design, wherein the second design includes the one or more second components; and selecting the second design in response to determining that the measure of similarity between is above a threshold level.

20. In some embodiments, a computing device comprises: a memory that includes a design recommendation application; and a processor that is coupled to the memory and, when executing the design recommendation application, is configured to: determine, via a processor, a first function associated with one or more first components included in a first design; analyze, via the processor, a plurality of components included in a database to select one or more second components associated with a second function that corresponds to the first function; and cause an alternative design recommendation that includes the one or more second components to be output for display.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating an alternative design recommendation, the method comprising:
    determining, via one or more processors, a first function associated with one or more first component assemblies included in a first design;
    causing, via the one or more processors, a display to show a description of the first function;
    analyzing, via the one or more processors, a plurality of alternative designs included in a database to compute measures of similarity between the one or more first component assemblies and one or more alternative component assemblies included in an alternative design included in the plurality of alternative designs, wherein the one or more alternative component assemblies are associated with an alternative function;
    selecting, based on the measures of similarity between the first design and the plurality of alternative designs, a second design that includes one or more second component assemblies associated with a second function that corresponds to the first function; and
    causing, via the one or more processors, the display to show an alternative design recommendation that includes the one or more second component assemblies.

2. The method of claim 1, further comprising automatically replacing the one or more first component assemblies in the first design with the one or more second component assemblies in the second design.

3. The method of claim 1, wherein determining the first function comprises receiving a user selection that assigns the first function to the one or more first component assemblies.

4. The method of claim 1, further comprising retrieving, from the database, the first function in response to receiving a user selection of the one or more first component assemblies.

5. The method of claim 1, further comprising computing a second measure of similarity between the first function and the second function.

6. The method of claim 5, wherein selecting the one or more second component assemblies is performed in response to determining that the second measure of similarity between the first function and the second function is above a predefined threshold.

7. The method of claim 1, further comprising computing a measure of similarity between the first design and a second design stored in the database, wherein the second design includes the one or more second component assemblies.

8. The method of claim 1, wherein computing the measures of similarity comprises computing a given measure of similarity between a first graph that corresponds to the first design and an alternative graph that corresponds to the alternative design included in the plurality of alternative designs.

9. The method of claim 8, wherein the given measure of similarity between the first design and the alternative design is computed based on one or more graph matching algorithms.

10. The method of claim 1, further comprising determining a connection type associated with the one or more first component assemblies, wherein selecting the second design is further based on the connection type.

11. The method of claim 1, further comprising determining a value corresponding to the degrees of freedom for the one or more component assemblies, wherein selecting the second design is further based on the value.

12. The method of claim 1, wherein the one or more first component assemblies includes a plurality of component types.

13. One or more non-transitory computer-readable storage media including instructions that, when executed by one or more processors, cause the one or more processors to perform the steps of:
    determining, via one or more processors, a first function associated with one or more first component assemblies included in a first design;
    causing, via the one or more processors, a display to show a description of the first function;
    analyzing, via the one or more processors, a plurality of alternative designs included in a database to compute measures of similarity between the one or more first component assemblies and one or more alternative component assemblies included in an alternative design included in the plurality of alternative designs, wherein the one or more alternative component assemblies are associated with an alternative function;
    selecting, based on the measures of similarity between the first design and the plurality of alternative designs, a second design that includes one or more second component assemblies associated with a second function that corresponds to the first function; and
    causing, via the one or more processors, the display to show an alternative design recommendation that includes the one or more second component assemblies.

14. The one or more non-transitory computer-readable storage media of claim 13, further comprising instructions that, when executed by the one or more processors, cause the one or more processors to further perform the step of automatically replacing the one or more first component assemblies in the first design with the one or more second component assemblies in the second design.

15. The one or more non-transitory computer-readable storage media of claim 13, wherein determining the first function comprises receiving a user selection that assigns the first function to the one or more first component assemblies.

16. The one or more non-transitory computer-readable storage media of claim 13, further comprising instructions that, when executed by the one or more processors, cause the one or more processors to further perform the step of retrieving, from the database, the first function in response to receiving a user selection of the one or more first component assemblies.

17. The one or more non-transitory computer-readable storage media of claim 13, further comprising instructions that, when executed by the one or more processors, cause the one or more processors to further perform the step of computing a second measure of similarity between the first function and the second function.

18. The one or more non-transitory computer-readable storage media of claim 17, wherein selecting the one or more second component assemblies is performed in response to determining that the second measure of similarity between the first function and the second function is above a predefined threshold.

19. The one or more non-transitory computer-readable storage media of claim 13, wherein computing the measures of similarity comprises computing a given measure of similarity between a first graph that corresponds to the first design and an alternative graph that corresponds to the alternative design included in the plurality of alternative designs.

20. A computing device, comprising:
    a memory that includes a design recommendation application; and
    a processor that is coupled to the memory and, executes the design recommendation application, to:
        determine, via the processor, a first function associated with one or more first component assemblies included in a first design;
        cause, via the processor, a display to show a description of the first function;
        analyze, via the processor, a plurality of alternative designs included in a database to compute measures of similarity between the one or more first component assemblies and one or more alternative component assemblies included in an alternative design included in the plurality of alternative designs, wherein the one or more alternative component assemblies are associated with an alternative function;
        select, based on the measures of similarity between the first design and the plurality of alternative designs, a second design that includes one or more second component assemblies associated with a second function that corresponds to the first function; and
        cause, via the processor, the display to show an alternative design recommendation that includes the one or more second component assemblies.

* * * * *